United States Patent [19]

Beausoleil

[11] 3,765,001

[45] Oct. 9, 1973

[54] ADDRESS TRANSLATION LOGIC WHICH PERMITS A MONOLITHIC MEMORY TO UTILIZE DEFECTIVE STORAGE CELLS

[75] Inventor: William Francis Beausoleil, Poughkeepsie, N.Y.

[73] Assignee: International Business Machines Corporation, Armonk, N.Y.

[22] Filed: Nov. 15, 1971

[21] Appl. No.: 198,870

Related U.S. Application Data

[63] Continuation-in-part of Ser. No. 76,917, Sept. 30, 1970, Pat. No. 3,714,637.

[52] U.S. Cl. ..... 340/173 R, 340/172.5, 340/173 BB

[51] Int. Cl. ..... G11c 11/40

[58] Field of Search ..... 340/173 BB, 174.1 EM, 340/172.5

[56] References Cited

UNITED STATES PATENTS

| | | | |
|---|---|---|---|
| 3,222,653 | 12/1965 | Rice | 340/172.5 |
| 3,434,116 | 3/1969 | Anacker | 340/172.5 |
| 3,541,525 | 11/1970 | Gange | 340/173.1 |
| 3,588,830 | 6/1971 | Duda | 340/173 BB |
| 3,350,690 | 10/1967 | Rice | 340/173 BB |
| 3,234,521 | 2/1966 | Weisbecker | 340/173 BB |
| 3,331,053 | 7/1967 | Perkins | 340/173 BB |
| 3,432,812 | 3/1969 | Elfant | 340/173 BB |

*Primary Examiner*—Terrell W. Fears
*Attorney*—W. N. Barret, Jr. et al.

[57] ABSTRACT

In the production of monolithic memory chips used in computer storage devices a certain percentage is rejected in production as containing one or more defective bit cells on the chip. These almost perfect chips are arranged on a memory card bit so that all of the bit cards of a particular memory product are identical to those sections containing defective bit cells. The valid cells are logically arranged in contiguous address locations by translation logic which converts the address before it is presented to the memory bit cards. Addresses presented to the logic are re-ordered such that all addresses that, untranslated, would have selected a defective area of a chip, after being translated select a non-defective area of a chip.

2 Claims, 26 Drawing Figures

INVENTOR
WILLIAM F. BEAUSOLEIL

BY Owen Lamb

ATTORNEY

| QUADRANT | CHIP 0 | CHIP 1 | CHIP 2 | CHIP 3 |
|---|---|---|---|---|
| 3 | $A_3$ | $A_7$ | $A_{11}$ | $A_{15}$ |
| 2 | $A_2$ | $A_6$ | $A_{10}$ | $A_{14}$ |
| 1 | $A_1$ | $A_5$ | $A_9$ | $A_{13}$ |
| 0 | $A_0$ | $A_4$ | $A_8$ | $A_{12}$ |

1/2 SIZE MEMORY

1/2 OR FULL SIZE MEMORY

1/4, 1/2, 3/4 OR FULL SIZE MEMORY

DEFECT IN WORD LINE DIRECTION

DEFECT IN BIT LINE DIRECTION

7/8 GOOD

MULTI-DIRECTION

MULTI-AREAS 75% GOOD

MULTI-DIRECTION AND AREA 75% GOOD

ADDRESS TRANSLATION LOGIC WHICH PERMITS A MONOLITHIC MEMORY TO UTILIZE DEFECTIVE STORAGE CELLS

CROSS REFERENCE TO RELATED APPLICATION

This application is a continuation-in-part of U.S. Pat. application Ser. No. 76,917 entitled "Monolithic Memory Utilizing Defective Storage Cells," by W. F. Beausoleil, filed on Sept. 30, 1970 now U.S. Pat. No. 3,714,637. The memory disclosed herein is claimed in co-pending U.S. Pat. application Ser. No. 198,869 entitled "Monolithic Memory Utilizing Defective Storage Cells," by W. F. Beausoleil, filed Nov. 15, 1971 which is also a and continuation-in-part of U.S. Pat. application Ser. No. 76,917.

BACKGROUND OF THE INVENTION

This invention relates to address translation logic for use in a memory utilizing defective memory components that normally would be rejected in production.

Monolithic memories are memories in which a number of storage cells are formed on a single silicon wafer. The wafers are cut into a number of smaller units called chips. These chips are arranged on substrates and the substrates are packaged on integrated circuit modules. The integrated circuit modules are soldered onto printed circuit cards to make up a basic component of a memory. In the production of monolithic chips, the yield of good chips from the silicon wafer is low, especially in the first few years of production. For each perfect chip produced, there are a number of chips that are almost perfect, having localized imperfections which only render unusable a single cell or a few closely associated cells. In the past, error correction codes have been used to correct words read from a memory in which certain bits of the word are stored in defective cells. This technique has the disadvantage that it reduces the reliability of the memory by decreasing the effectiveness of error correction of normal memory operations.

Other prior memories are wired during production so that the wiring bypasses defective cells. This technique is expensive and results in memories which cannot be repaired with standard parts.

SUMMARY OF THE INVENTION

It is an object of this invention to provide an address translation circuit in a monolithic memory utilizing almost perfect chips to produce a useable memory which appears to the user to be comprised of all perfect chips.

A further object of this invention is to provide an address translator for use in a monolithic memory, which translator combines partially defective chips, non-defective chips, or combinations of partially defective and non-defective chips.

Briefly, the invention is embodied in a memory apparatus in which chips, which have been sorted during the production process into chips having defective areas in similar locations, are arranged in the same pattern on each array card. Address translation logic constructed in accordance with the present invention is provided between the memory address register and the array card. The logic translates each address to thereby avoid the addressing of cells in the defective areas. Upon input to the system of an address corresponding to a cell in a defective area of a chip, the logic circuitry transforms the address to that of a cell in a non-defective area of a chip.

In accordance with one aspect of the invention, the valid cells are logically placed in contiguous address locations by converting the memory address before presenting it to the decoders on the memory array card.

In accordance with another aspect of the invention, the sections containing the invalid memory bit cells are logically placed in high order address positions which are beyond the maximum permissible valid addresses. For any particular memory, the memory bit capacity is decreased depending upon the yield of defective chips. However, the memory has the same characteristics as if it were populated by perfect chips. No new design of the bit card or module is necessary.

In accordance with another aspect of this invention, translator logic is provided so that chips which have been sorted and separated into classes depending upon what percentage of the chip contains good cells, can be placed on modules with a mixture of chips of each percentage. The number of chips of each percentage can thusly be chosen to obtain the most advantageous arrangement taking into consideration such factors as the module count, power dissipation and reliability. For example, translation logic is shown which permits a bit card to be made up of a mixture of defective chips and non-defective chips.

In accordance with still another aspect of the invention, a partially defective memory is combined with another memory, or a partially defective module or modules are combined with another module in such a manner that the high order binary addresses that would have accessed defective areas, access good areas on the additional memory or module.

The foregoing and other objects, features and advantages of the invention will be apparent from the following more particular description of a preferred embodiment of the invention, as illustrated in the accompanying drawings.

Figure 1:
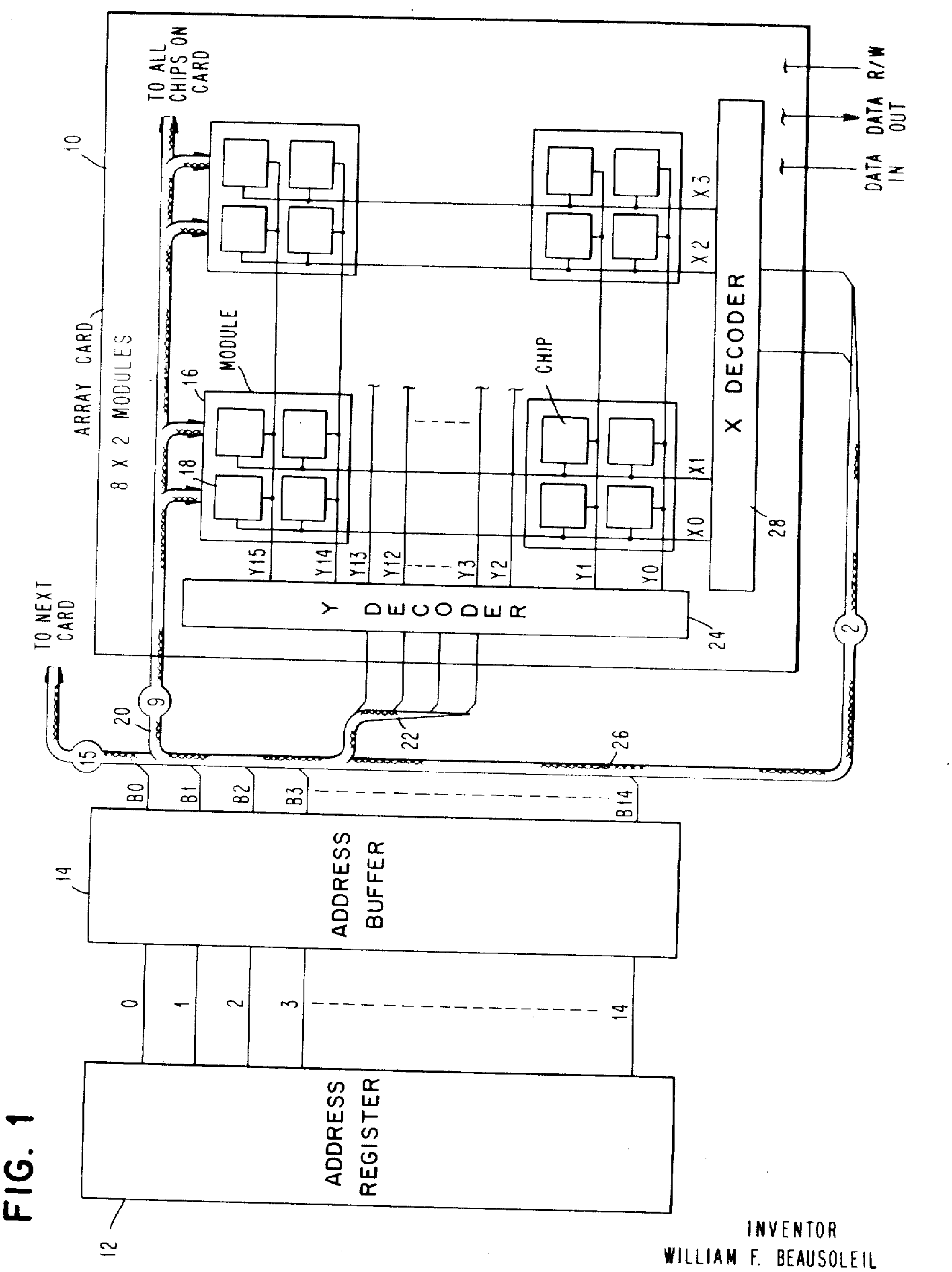
FIG. 1 is a block schematic diagram of a monolithic memory in which the invention is embodied.

The following description refers to a monolithic memory, however, it is understood that the invention can be applied to other types of memories and to arithmetic logic circuitry as well as memories.

The preferred embodiment of this memory contains a plurality of data words, each of which contains 72 bits of information. In the preferred embodiment, each bit in a word is supplied by a different card, so a basic operational memory (BOM) will contain 72 array cards. Each card contains 128 array chips (32 modules), and each chip contains 256 bit cells. With 128 chips per card and 256 bits per chip, this memory will have a capacity of 32, 768 words. With 72 bits per word, the BOM will contain over half a million bytes. Of course, several BOM's may be joined together to form a larger memory. In order to address a memory of this size at the word level, fifteen address bits are required. Seven of the address bits will specify one of the chips on a card and the remaining eight address bits will specify a cell within the chip. The 15 address bits are normally used in parallel to simultaneously address a single cell on each of the 72 cards. These 72 cells form a word.

The 15 address bits can be broken down still further. The card can be regarded as being divided into 16 logical sectors, each sector containing eight chips. In this case, four of the seven module chip-address bits will define a card sector and the remaining three bits of the module chip-address will select a specific chip within the sector. If we also regard each chip as being logically divided into 32 sectors, then five of the eight cell-address bits will indicate a specific chip sector and the remaining three cell-address bits will indicate a specific memory cell within the sector.

Referring to FIG. 1, a monolithic memory in which the invention is embodied is shown. The memory is comprised of a plurality of array cards 10, each card representing one bit position of a word in a three dimensional memory. Only one array card is shown; however, a number of such cards is necessary depending on how many bit positions are in a full word. The memory is addressed by means of an address stored in address register 12, which address is re-powered by address buffer 14.

Each array card 10 is comprised of a plurality of modules 16. Each module is comprised of four chips. A single chip is shown in more detail in FIG. 2. The bit addresses on a chip are arbitrarily divided into logical quadrants, and the two binary address bits which address these quadrants are called the quadrant address.

The output 20 from the address buffer 14 is connected to all chips throughout the memory and is decoded to select a single bit cell on the chip, as is more fully described with reference to FIG. 2.

The output 22 of the address buffer 14 drives a Y decoder 24 and the output 26 from the address buffer drives an X decoder 28 on the array card. The decoded outputs of the Y decoder and the X decoder energize a single chip at the intersection of the energized outputs.

Figure 2:
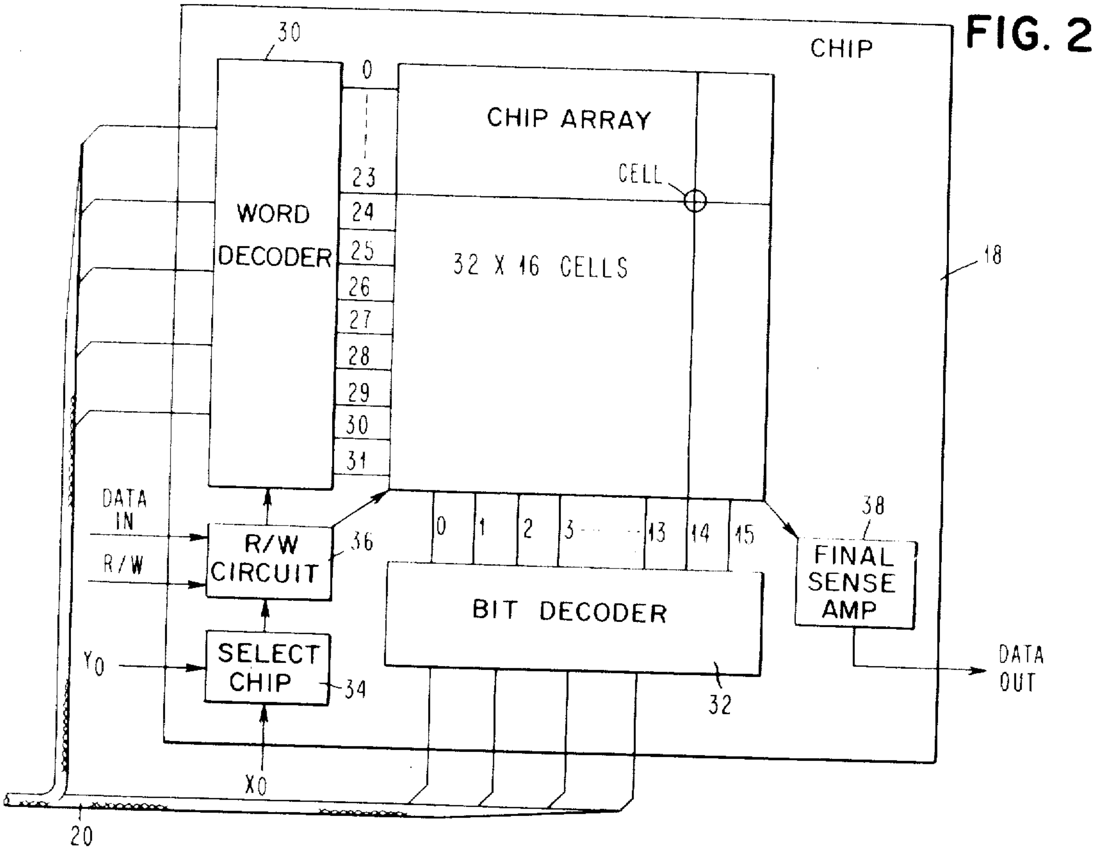
FIG. 2 is a more detailed block diagram of one chip of the memory of FIG. 1.

Referring to FIG. 2, a single chip is shown in more detail. The word decoder 30 and the bit decoder 32 decode the output 20 from the address buffer which results in the selection of a single bit from the chip at the intersection of the energized decoder output lines.

Each chip is also provided with select chip circuitry 34 responsive to the X and Y coordinate lines. When the appropriate X and Y lines are energized, the select chip logic 34 activates the read/write (R/W) circuit 36. When the R/W input of the R/W circuit is energized, the data on "data in" line is stored in the selected memory cell in the chip array. Only that cell which is selected by the word decoder and the bit decoder is activated for storage.

Similarly, data are sensed by the final sense amplifier 38 which is connected to the array in such a manner that it responds to read data from the cell which is energized by the word decoder and the bit decoder.

The details of the chip array, decoders, write circuitry, and read circuits vary from memory-to-memory and therefore, have not been shown in detail. A typical memory in which the invention may be embodied is shown in an article entitled "A High-Performance LSI Memory System" by Richard W. Bryant et al. on pages 71 – 77 in the July 1970 issue of Computer Design.

Figure 3A:
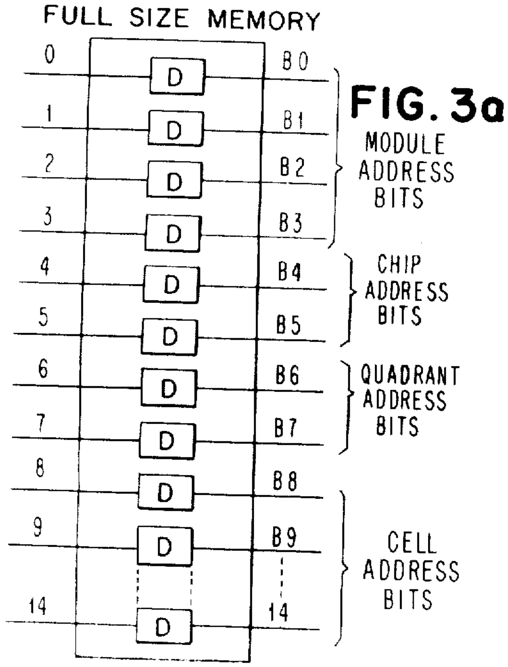
FIGS. 3A and 3B are a block schematic diagram and chart of an address buffer for a full size memory.

Referring to FIG. 3A, the organization of an address buffer for use in the memory when full-capacity, perfect chips are used is shown. The outputs 0–14 from the address register are unmodified by the address buffer and are driven to the module, chip, quadrant, and low order address positions as shown in FIG. 3A.

Figure 3B:
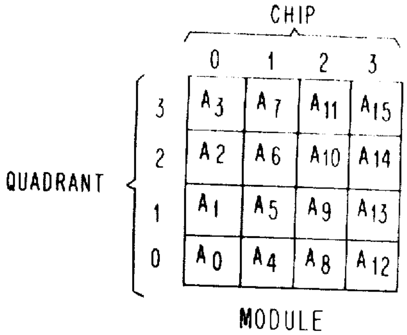

FIG. 3B is a diagram of one module out of the sixteen modules on a card showing the quadrant and chip addresses selectable by a full size memory. The full size memory has no defective chips and therefore, all of the addresses within the group of addresses represented by $A_0, A_1, \ldots A_{15}$ are utilized in the module. The physical arrangement and sequences of addresses are arbitrary and the ones chosen are for illustration purposes only.

The only address bit positions of interest in explaining the invention are positions 4 and 5 representing the chip address of the module and 6 and 7 representing an arbitrary quadrant address. Since in the drawing of FIG. 2 a chip has a total of 512 memory cells, each quadrant contains a total of 128 discrete cell addresses, represented in the drawing of FIG. 3B as $A_0$, $A_1$, $A_2$ and $A_3$ for chip zero. The address locations of FIG. 3B as selected by the address buffer 14 of FIG. 3A are contiguous, that is, if a binary sequence is presented to the input of address buffer 14, the addresses generated at the output are sequential. It should be understood that the addresses continue from module to module (i.e., the total addresses are $A_0 \ldots A_n$ depending upon the number of modules).

Figure 4A:
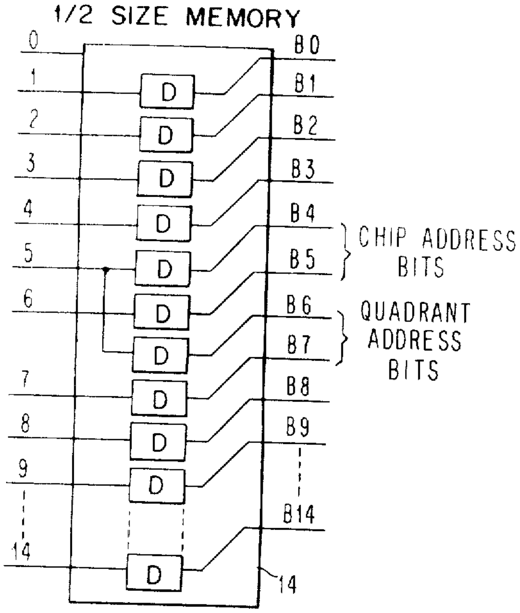
FIGS. 4A and 4B are a block schematic diagram and chart of a one-half size memory.

FIG. 4A is a circuit for the address buffer 14 which will yield a one-half size memory, that is, a memory in which half of the addresses are not selected. However, the addresses which are selected are contiguous.

Figure 4B:
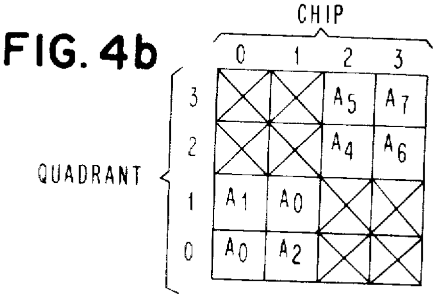

The one-half size memory is structed as follows: First, the chips are sorted into those chips which have defective addresses in the second and/or third quadrants only and chips having defects in the first and second quadrants only. Chips having defects in the second and/or third quadrants are placed in chip position 0 and chip position 1 of each module. Those having defects in the 0 and/or first quadrants are placed in the second and third chip positions of the module. Since the memory is only one-half size, position 0 of the address register is not used and address leads are moved to the next higher order bit position as shown in FIG. 4A. The address register bit position 5, 6 and 7 are cross-wired as shown to the four module inputs B4, B5, B6, and B7 corresponding to the chip address and quadrant address. This produces contiguous addresses to the 8 good quadrants within the module in accordance with the address sequence shown in FIG. 4B.

Figure 5A:
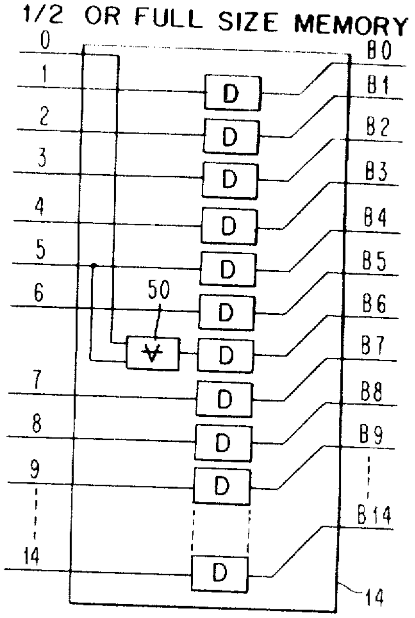
FIGS. 5A and 5B are a block schematic diagram and chart of an address buffer for utilization in a one-half or a full size memory.
Figure 5B:
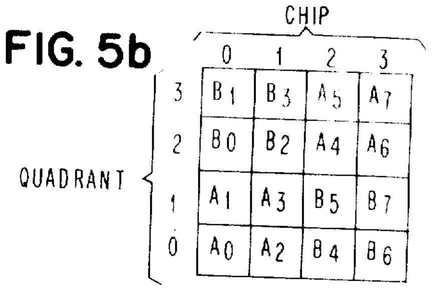

FIG. 5A illustrates the internal logic necessary in the address buffer 14 to provide a full size and/or a one-half size memory. This type of circuit could be used with a memory that is populated with all good circuit cards or with circuit cards having some chips with defects of the type described with respect to FIGS. 4A and 4B. This is accomplished with the circuitry of FIG. 5 by wiring the 0 input of the address buffer to an Exclusive OR circuit 50. When a one-half size memory is desired, the 0 input is not energized and the circuit behaves the same as that shown in FIG. 4A. However, if a full size memory is addressed, the 0 position is used and the Exclusive OR 50 produces a pattern as shown in FIG. 5B. Thus, the addresses are contiguous starting with $A_0$ through $A_n$ and continue with the next address $B_0$ through address $B_n$ to provide a full size memory. Of course, as will be shown below, fractional size memories between one-half and full can be obtained by placing all good modules in appropriate lower order module positions. Furthermore, while chips with quadrants 0 and 1 or 2 and 3 defective have been shown and described, it is understood that chips with quadrants 0 and 2, 0 and 3, 1 and 2, or 1 and 3 can be utilized.

Figure 6A:
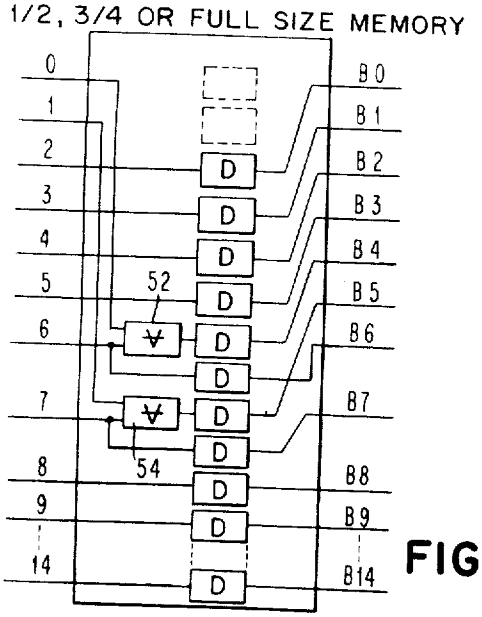
FIGS. 6A and 6B are a block schematic diagram and chart of a memory address buffer for use as a one-fourth, one-half, three-fourths, or full size memory.

FIG. 6A discloses a circuit for use in the address buffer which will provide a one-fourth, one-half, three-fourths, or full size memory. Fractional sizes in between are possible as explained below. If a one-fourth memory is desired (which, of course, may prove to be uneconomical), then the modules are sorted out into four different classes. Those having defects in quadrants 1, 2 and 3 are placed in the chip 0 position, those having defects in quadrants 0, 2 and 3 are placed in the chip 1 position on the module, those having defects in quadrants 0, 1 and 3 are placed in the chip 2 position on the module and finally, those having defects in quadrants 0, 1 and 2 are placed in the chip 3 position on the module. Since this is a one-quarter size memory, the higher order bit positions 0 and 1 of the address register are not needed and therefore, are not energized. In the case of a one-fourth size memory, the Exclusive ORs 52 and 54 have no effect on the circuit and the address sequence is $A_0, A_1, A_2 \ldots A_n$ (See FIG. 6B). If a one-half size memory is desired, the one bit position input to the buffer register 14 is energized causing the Exclusive OR 54 to provide sequential addresses above $A_n$, i.e., $B_0, B_1, B_2 \ldots B_n$.

Similarly, for a three-quarter size memory, the Exclusive ORs 52 and 54 produce next higher sequential address positions $C_o - C_n$. Finally, for a full size memory, the next sequential sequence $D_0 - D_n$ is produced utilizing the final positions of the chip.

It should be understood that the present invention contemplates the use of any combination of non-defective, partially defective and possibly totally defective chips (partially defective modules) on the same bit card.

The logic circuit shown in FIG. 6A is designed with the ability to accommodate 25 percent good, 50 percent good, 75 percent good or 100 percent good memory modules. Furthermore, the chips on these modules can be mixed to provide fractional memory sizes. (A similar mixing of chips and modules is possible with the circuit of FIG. 5A.) Following the contiguous addressing scheme $A_0 \ldots A_{63}$, $B_0 \ldots B_{63}$, $C_0 \ldots C_{63}$, $D_0 \ldots D_x$, a large variety of combinations can exist depending upon the value of $x$. Fifteen different size storage cards can be accommodated by combining 75 percent as well as 100 percent modules on a 16 module card. There are 30 other sizes that can also be assembled by combining 75 percent – 50 percent – 25 percent modules on the same card. This is accomplished without any modification to the logic shown in FIG. 6A.

Figure 8A:
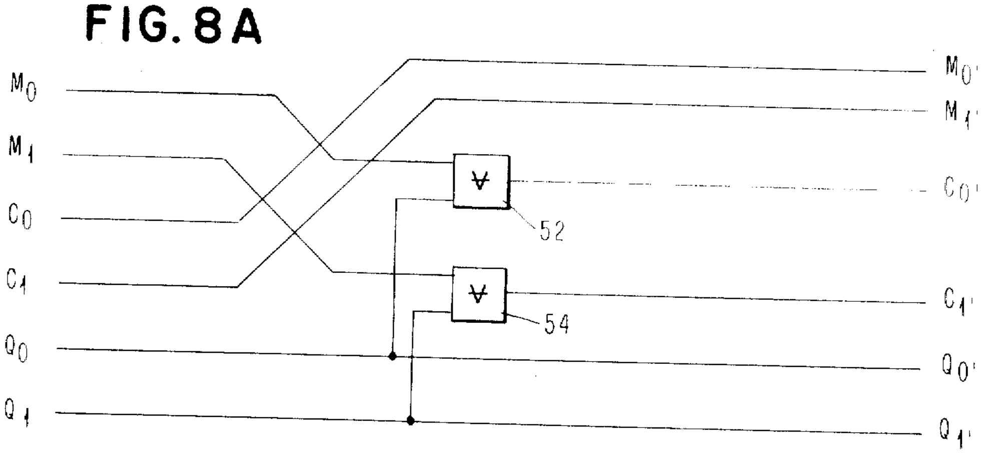
FIGS. 8A and 8B are a logic diagram and chart of an abbreviated form of the decoder of FIG. 6A.

To illustrate how this is accomplished, the circuit of FIG. 6A has been redrawn in FIG. 8A omitting certain lower order and higher order addresses so that only four modules of the 16 module card are shown. Thus, where the circuitry of FIG. 6A addresses $A_0 \ldots A_{63}$, $B_0 \ldots B_{63}$, etc., the circuit of FIG. 8A illustrated in FIG. 8B addresses $A_0 \ldots A_{15}$, $B_0 \ldots B_{15}$, etc. It should be understood that the circuit of FIG. 8A is functionally identical to the circuit of FIG. 6A which has been modified solely for illustration purposes. $M_0$, $M_1$ refer to module addresses, $C_0$, $C_1$ refer to chip addresses and $Q_0$, $Q_1$ refer to quadrant addresses. The Exclusive OR's 52, 54 correspond to Exclusive OR's 52, 54 of FIG. 6A.

Figure 8B:
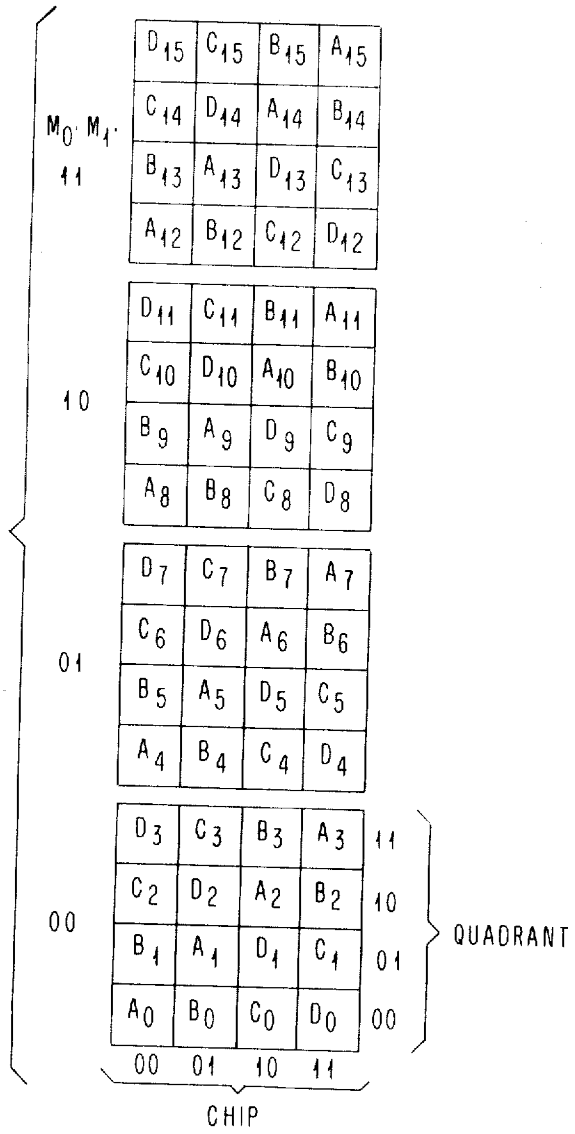

The following truth table describes the inputs and outputs of the circuit of FIG. 8A, with untranslated addresses in the left column and translated addresses in the right column. A map of the translated addresses (right column) is shown in FIG. 8B.

TABLE I

| | $M_0M_1$ | $C_0C_1$ | $Q_0Q_1$ | $M'_0M'_1$ | $C'_0C'_1$ | $Q'_0Q'_1$ |
|---|---|---|---|---|---|---|
| $A_0$ | 00 | 00 | 00 | 00 | 00 | 00 |
| | | 00 | 01 | 00 | 01 | 01 |
| | | 00 | 10 | 00 | 10 | 01 |
| | | 00 | 11 | 00 | 11 | 11 |
| | | 01 | 00 | 01 | 00 | 00 |
| | | 01 | 01 | 01 | 01 | 01 |
| | | 01 | 10 | 01 | 10 | 10 |
| | | 01 | 11 | 01 | 11 | 11 |
| | | 10 | 00 | 10 | 00 | 00 |
| | | 10 | 01 | 10 | 01 | 01 |
| | | 10 | 10 | 10 | 10 | 10 |
| | | 10 | 11 | 10 | 11 | 11 |
| | | 11 | 00 | 11 | 00 | 00 |
| | | 11 | 01 | 11 | 01 | 01 |
| | | 11 | 10 | 11 | 10 | 10 |
| $A_{15}$ | 00 | 11 | 11 | 11 | 11 | 11 |
| | $M_0M_1$ | $C_0C_1$ | $Q_0Q_1$ | $M'_0M'_1$ | $C'_0C'_1$ | $Q'_0Q'_1$ |
| $B_0$ | 01 | 00 | 00 | 00 | 01 | 00 |
| | | 00 | 01 | 00 | 00 | 01 |
| | | 00 | 10 | 00 | 11 | 10 |
| | | 00 | 11 | 00 | 10 | 11 |
| | | 01 | 00 | 01 | 01 | 00 |
| | | 01 | 01 | 01 | 00 | 01 |
| | | 01 | 10 | 01 | 11 | 10 |
| | | 01 | 11 | 01 | 10 | 11 |
| | | 10 | 00 | 10 | 00 | 00 |
| | | 10 | 01 | 10 | 11 | 01 |
| | | 10 | 10 | 10 | 01 | 10 |
| | | 10 | 11 | 10 | 10 | 11 |
| | | 11 | 00 | 11 | 00 | 00 |
| | | 11 | 01 | 11 | 11 | 01 |
| | | 11 | 10 | 11 | 01 | 10 |
| $B_{15}$ | 01 | 11 | 11 | 11 | 10 | 11 |
| | $M_0M_1$ | $C_0C_1$ | $Q_0Q_1$ | $M'_0M'_1$ | $C'_0C'_1$ | $Q'_0Q'_1$ |
| $C_0$ | 10 | 00 | 00 | 00 | 10 | 00 |
| | | 00 | 01 | 00 | 11 | 01 |
| | | 00 | 10 | 00 | 00 | 10 |
| | | 00 | 11 | 00 | 01 | 11 |
| | | 01 | 00 | 01 | 10 | 00 |
| | | 01 | 01 | 01 | 11 | 01 |
| | | 01 | 10 | 01 | 00 | 10 |
| | | 01 | 11 | 01 | 01 | 11 |

TABLE I – Continued

| | | | | | | |
|---|---|---|---|---|---|---|
| ↓ | ↓ | 10 | 00 | 10 | 10 | 00 |
| | | 10 | 01 | 10 | 11 | 01 |
| | | 10 | 10 | 10 | 00 | 10 |
| | | 10 | 11 | 10 | 01 | 11 |
| | | 11 | 00 | 11 | 10 | 00 |
| | | 11 | 01 | 11 | 11 | 01 |
| | | 11 | 10 | 11 | 00 | 10 |
| $C_{15}$ | 10 | 11 | 11 | 11 | 01 | 11 |
| | $M_0M_1$ | $C_0C_1$ | $Q_0Q_1$ | $M'_0M'_1$ | $C'_0C'_1$ | $Q'_0Q'_1$ |
| $D_0$ | 11 | 00 | 00 | 00 | 11 | 00 |
| ↓ | ↓ | 00 | 01 | 00 | 10 | 01 |
| | | 00 | 10 | 00 | 01 | 10 |
| | | 00 | 11 | 00 | 00 | 11 |
| | | 01 | 00 | 01 | 11 | 00 |
| | | 01 | 01 | 01 | 10 | 01 |
| | | 01 | 10 | 01 | 01 | 10 |
| | | 01 | 11 | 01 | 00 | 11 |
| | | 10 | 00 | 10 | 11 | 00 |
| | | 10 | 01 | 10 | 10 | 01 |
| | | 10 | 10 | 10 | 01 | 10 |
| | | 10 | 11 | 10 | 00 | 11 |
| | | 11 | 00 | 11 | 11 | 00 |
| | | 11 | 01 | 11 | 10 | 01 |
| | | 11 | 10 | 11 | 01 | 10 |
| $D_{15}$ | 11 | 11 | 11 | 11 | 00 | 11 |

Figure 6B:
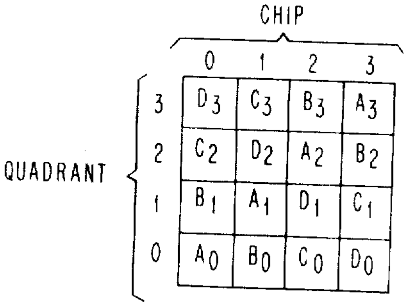

In FIG. 6B, the first module of the 16 module card was shown with the addresses falling in a particular sequential pattern. In FIG. 8B, the same address pattern is shown in module 00. The pattern continues for all four modules. It can be seen that as sequential addresses are traced through the memory, addresses $A_0$–$A_3$ fall out on module 00, addresses $A_4$–$A_7$ fall out on module 10, etc. Thus, when the addresses $A_0$–$A_{15}$ have been completed, one-quarter of each of the four modules has been addressed. When the addresses $B_0$–$B_{15}$ have been completed, one-half of the memory has been accessed, one-half of each module. When the addresses $C_0$–$C_{15}$ have been completed, three-fourths of the memory has been accessed, three-fourths of each module. If the memory is populated with all 75 percent good modules, the user would not access the addresses $D_0$–$D_{15}$ as these would address defective locations. However, if a 100 percent module is substituted for a 75 percent good module in module position 00, the addresses $D_0$–$D_3$ can be utilized as they will now address non-defective cells. Similarly, if a 100 percent module is substituted for module 01, the addresses $D_4$–$D_7$ can be accessed. The range of the memory can be thus extended by substituting 100 percent modules for 75 percent modules.

Furthermore, it is apparent that a further subdivision in fractional size of the memory can be accomplished by mixing chips on a particular module and replacing a partially defective chip, for example, with a good chip, or of a chip having a greater area of non-defective cells. For example, if a nondefective chip is placed in chip location 11 of module 00, the address $D_0$ can be utilized thus extending the range of a three-quarter size memory by the number of cells covered by the addresses represented by $D_0$.

In the circuit illustrated by FIGS. 8A and 8B, it can be seen that modules having a predetermined percentage of defect free areas are replaceable by modules having a higher percentage of defect free areas and the addressing range is extended appropriately into the higher order addresses positions previously occupied by defective areas. For example, looking at FIG. 8B, assume that the modules are all 25 percent good. This means that only addresses $A_0$–$A_{15}$ address good areas.

However, if a 50 percent module is placed in address module location 00, then addresses $B_0$–$B_3$ will address good locations. Similarly, a 50 percent module can be placed in position 01 and so forth. Thus, a 25 percent module can be replaced with a 50 percent module, a 50 percent module can be replaced by a 75 percent module and the 75 percent module can be replaced by a 100 percent module. Furthermore, if only defective chips are replaced, then percentages of good areas on a module inbetween those just recited are possible.

Figures 9A, 9B:
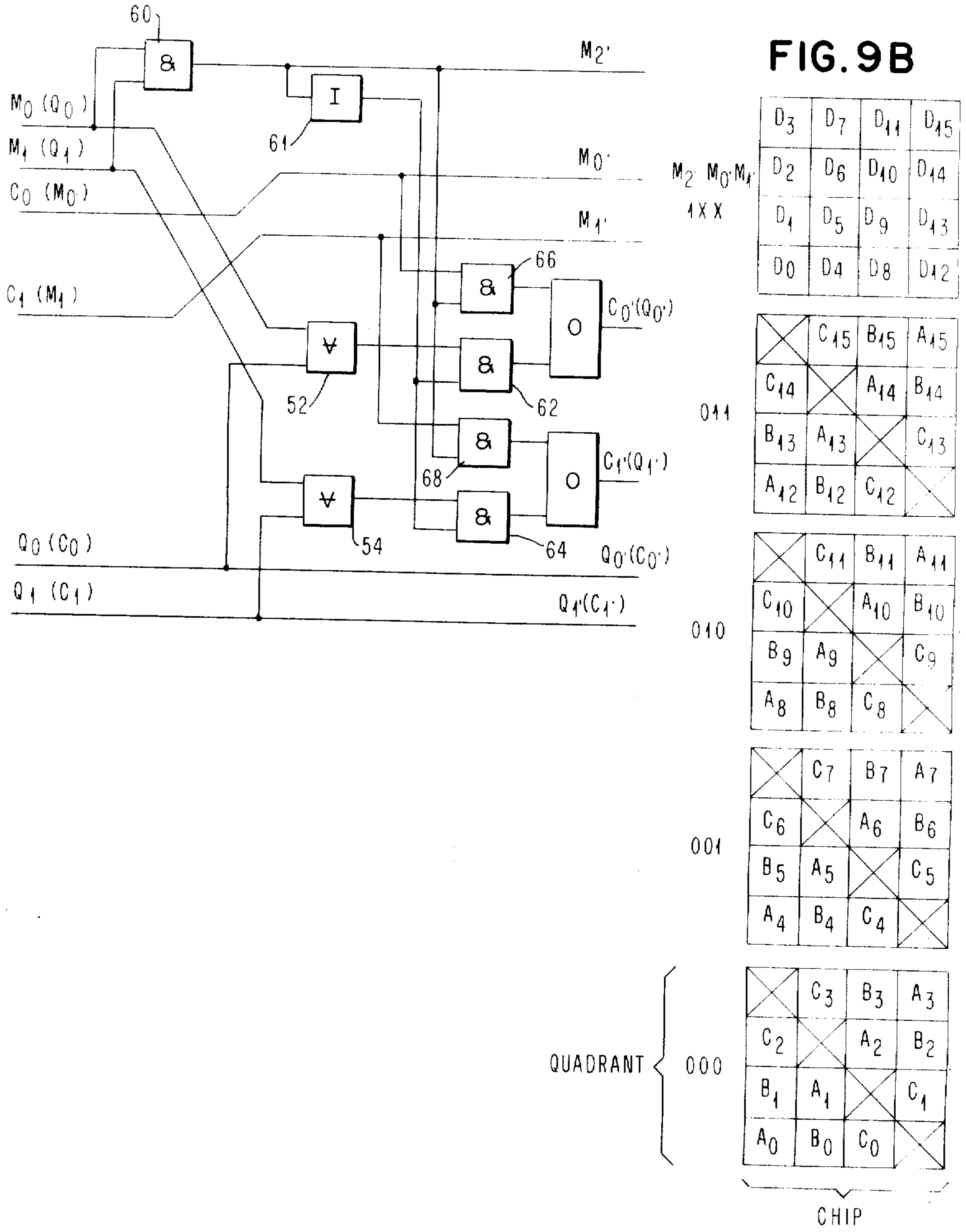
FIGS. 9A and 9B are a logic diagram and chart of a decoder for adding a module to the set of modules shown in FIGS. 8A and 8B.

In some applications it may be desirable to combine partially defective modules with an additional 100 percent module or with a module or modules of a different fraction of defective areas in order to extend the addressing. A circuit for doing this is shown in FIG. 9A and illustrated in FIG. 9B. In this circuit, a ratio of four 75 percent good modules to one 100 percent module is shown with a full range of addressing. That is, the higher order addresses $D_0$ – $D_{15}$ which, in a three-quarter size memory would have remained outside the useable range of the memory, are utilized by placing these addresses on an additional module which is comprised of, but not limited to, 100 percent chips. The technique is similar to that shown in FIG. 7 in which the higher order addresses are placed on modules of another memory. The difference is that in FIGS. 9A and 9B the additional module can be on the same card. (The "X" designation in FIG. 9B indicates that this module bit address is not wired in.) This is accomplished by utilizing an AND circuit 60 which senses when the addressing is in the higher one-fourth of the address spectrum (addresses $D_0$ – $D_{15}$) indicated by the high order address lines $M_0$ and $M_1$ being both equal to one. This causes an output from the AND circuit 60 which output via inverter 61 is utilized to negate (via AND's 62, 64) the effect of the logical exclusive ORs 52 and 54 which, as shown in FIG. 8A, were utilized to produce the address pattern in the lower order modules for the avoidance of defective chip areas. The AND's 66, 68 are energized by an output of AND 60. With the addressing back to normal (see FIG. 3B), the chip and quadrant addresses cause the upper one-fourth of the memory addresses to be mapped onto the higher order module in the pattern shown for addresses $D_0$ – $D_{15}$. Of course, it should be understood that the range of the memory can be extended beyond $D_{15}$ by adding more 100 percent modules and expanding the addressing appropriately. (Also note that by merely changing the line designations of FIG. 9A, as shown in parenthesis, the same circuit can be used to "fill out" defective addresses on a per module basis. Also, the logic can be accomplished by wiring changes instead of logical AND's, OR's or exclusive OR's.) Table II shows the address lines $D_0$ – $D_{15}$ with the untranslated addresses in the left column and the translated addresses in the right column. The addresses $A_0$ – $A_{15}$, $B_0$ – $B_{15}$, $C_0$ – $C_{15}$ are as shown in Table I.

TABLE II

| | $M_0M_1$ | $C_0C_1$ | $Q_0Q_1$ | $M'_0M'_1M'_2$ | $C'_0C'_1$ | $Q'_0Q'_1$ |
|---|---|---|---|---|---|---|
| $D_0$ | 11 | 00 | 00 | 001 | 00 | 00 |
| ↓ | ↓ | 00 | 01 | 001 | 00 | 01 |
| | | 00 | 10 | 001 | 00 | 10 |
| | | 00 | 11 | 001 | 00 | 11 |
| | | 01 | 00 | 011 | 01 | 00 |
| | | 01 | 01 | 011 | 01 | 01 |
| | | 01 | 10 | 011 | 01 | 10 |
| | | 01 | 11 | 011 | 01 | 11 |
| | | 10 | 00 | 101 | 10 | 00 |

Table II – Continued

| | | | | | | |
|---|---|---|---|---|---|---|
| ↓ | ↓ | 10 | 01 | 101 | 10 | 01 |
| | | 10 | 10 | 101 | 10 | 10 |
| | | 10 | 11 | 101 | 10 | 11 |
| | | 11 | 00 | 111 | 11 | 00 |
| | | 11 | 01 | 111 | 11 | 01 |
| | | 11 | 10 | 111 | 11 | 10 |
| $D_{15}$ | 11 | 11 | 11 | 111 | 11 | 11 |

Figure 10A:
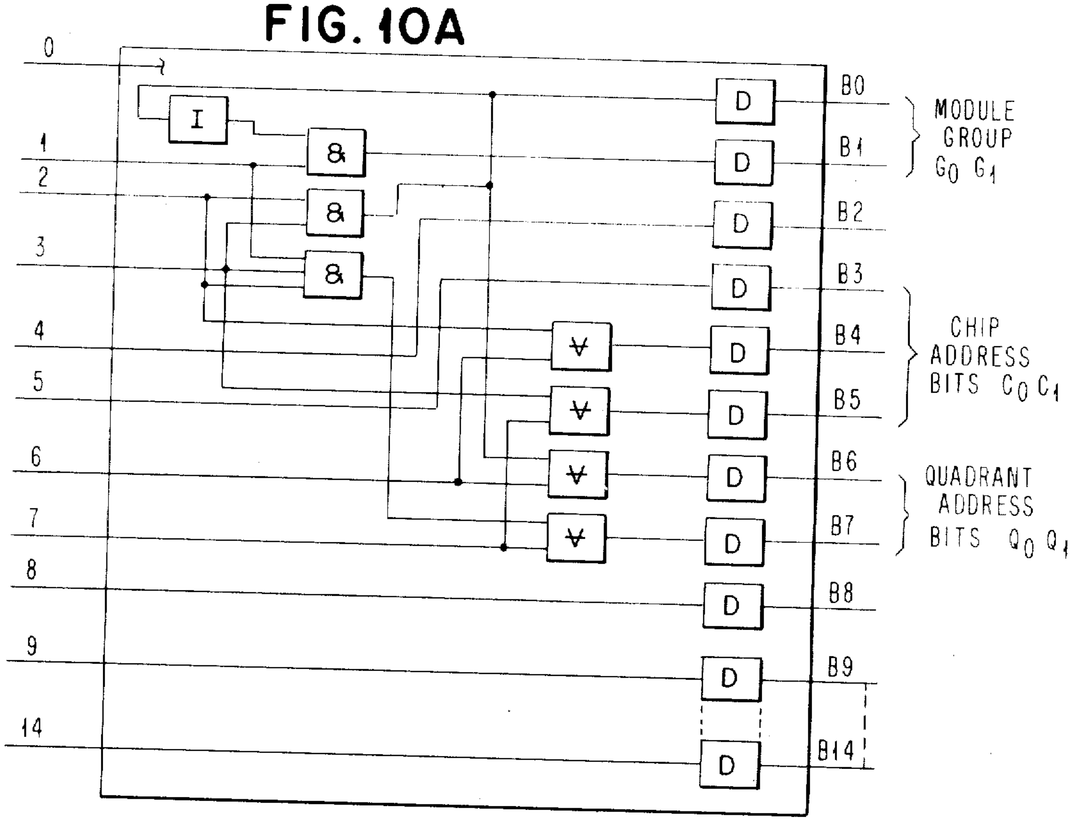
FIGS. 10A and 10B are a logic diagram and chart of a decoder for combining two 75 percent modules with a module which may be 25 percent, 50 percent, 75 percent or 100 percent good.
Figure 10B:
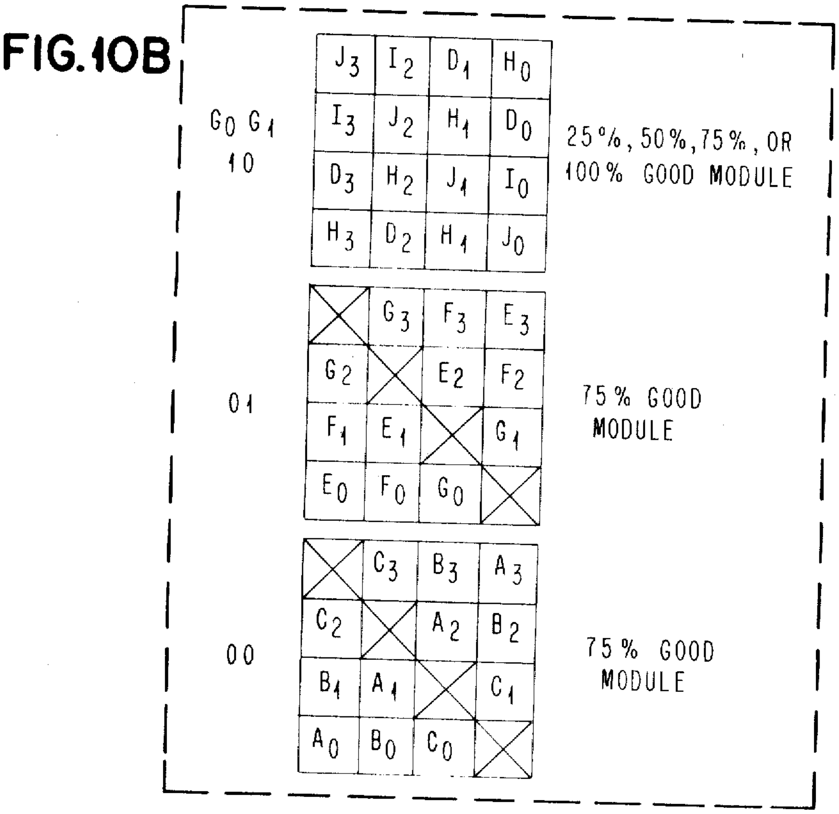

FIGS. 10A and 10B illustrate a memory in which 75 percent and 50 percent good modules are utilized. Only one module from ach group is shown. There are four modules in each group. A truth Table III is provided below. Note that addresses corresponding to letters A, B, C, D, E, F and G select seven-twelfths of the total capacity of the modules, i.e., 75 percent of modules in groups 00 and 01; 25 percent of modules in group 10. Each additional letter designation increments by one-fourth module the addressing capacity. Thus, A – H selects two-thirds capacity, A – I selects three-fourths capacity, and A – J selects five-sixths capacity. Thus, a 25 percent, 50 percent, 75 percent or 100 percent module may be utilized in position 10.

TABLE III

| Address bits0–14 | $G_0G_1$ | $C_0C_1$ | $Q_0Q_1$ | |
|---|---|---|---|---|
| 0000—00 | 00 | 00 | 00 | $A_0$ |
| 0000—01 | 00 | 01 | 01 | $A_1$ |
| 0000—10 | 00 | 10 | 10 | $A_2$ |
| 0000—11 | 00 | 11 | 11 | $A_2$ |
| 0001—00 | 00 | 01 | 00 | $B_0$ |
| 0001—01 | 00 | 00 | 01 | $B_1$ |
| 0001—10 | 00 | 11 | 10 | $B_2$ |
| 0001—11 | 00 | 10 | 11 | $B_3$ |
| 0010—00 | 00 | 10 | 00 | $C_0$ |
| 0010—01 | 00 | 11 | 01 | $C_1$ |
| 0010—10 | 00 | 00 | 10 | $C_2$ |
| 0010—11 | 00 | 01 | 11 | $C_3$ |
| 0011—00 | 10 | 11 | 10 | $D_0$ |
| 0011—01 | 10 | 10 | 11 | $D_1$ |
| 0011—10 | 10 | 01 | 00 | $D_2$ |
| 0011—11 | 10 | 00 | 01 | $D_3$ |
| 0100—00 | 01 | 00 | 00 | $E_0$ |
| 0100—01 | 01 | 01 | 01 | $E_1$ |
| 0100—10 | 01 | 10 | 10 | $E_2$ |
| 0100—11 | 01 | 11 | 11 | $E_3$ |
| 0101—00 | 01 | 01 | 00 | $F_0$ |
| 0101—01 | 01 | 00 | 01 | $F_1$ |
| 0101—10 | 01 | 11 | 10 | $F_2$ |
| 0101—11 | 01 | 10 | 11 | $F_3$ |
| 0110—00 | 01 | 10 | 00 | $G_0$ |
| 0110—01 | 01 | 11 | 01 | $G_1$ |
| 0110—10 | 01 | 00 | 10 | $G_2$ |
| 0110—11 | 01 | 01 | 11 | $G_3$ |
| 0111—00 | 10 | 11 | 11 | $H_0$ |
| 0111—01 | 10 | 10 | 10 | $H_1$ |
| 0111—10 | 10 | 01 | 01 | $H_2$ |
| 0111—11 | 10 | 00 | 00 | $H_3$ |
| 1000—00 | 10 | 10 | 00 | $I_0$ |
| 1000—01 | 10 | 11 | 01 | $I_1$ |
| 1000—10 | 10 | 00 | 10 | $I_2$ |
| 1000—11 | 10 | 01 | 11 | $I_3$ |
| 1001—00 | 10 | 11 | 00 | $J_0$ |
| 1001—01 | 10 | 10 | 01 | $J_1$ |
| 1001—10 | 10 | 01 | 10 | $J_2$ |
| 1001—11 | 10 | 00 | 11 | $J_3$ |

Figure 11B:
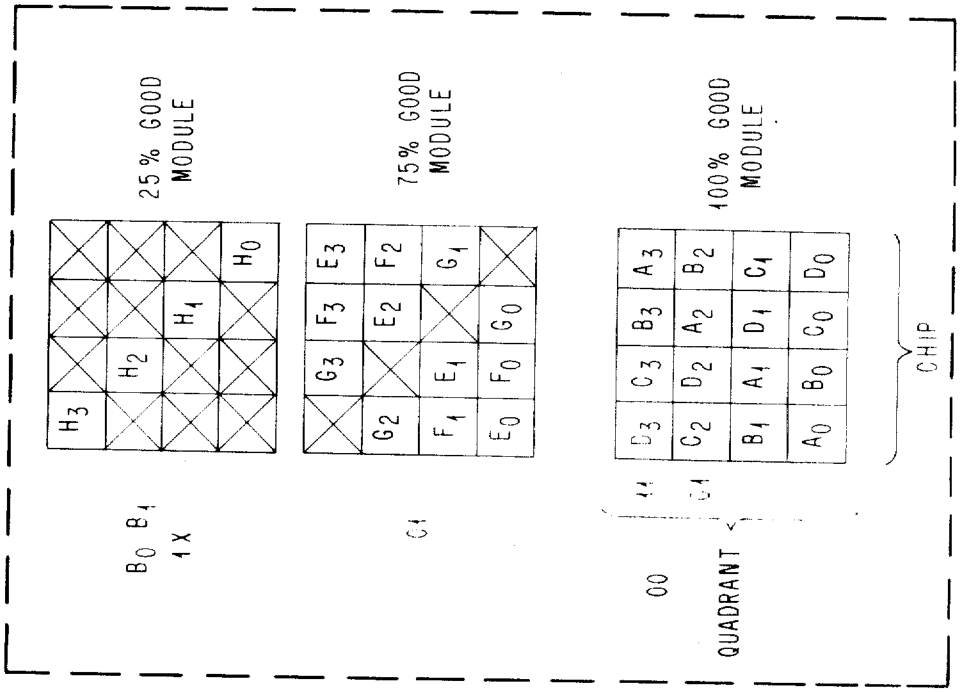
FIGS. 11A and 11B are a logic diagram and chart of a decoder for combining 25 percent good, 75 percent good, and 100 percent good modules.
Figure 11A:
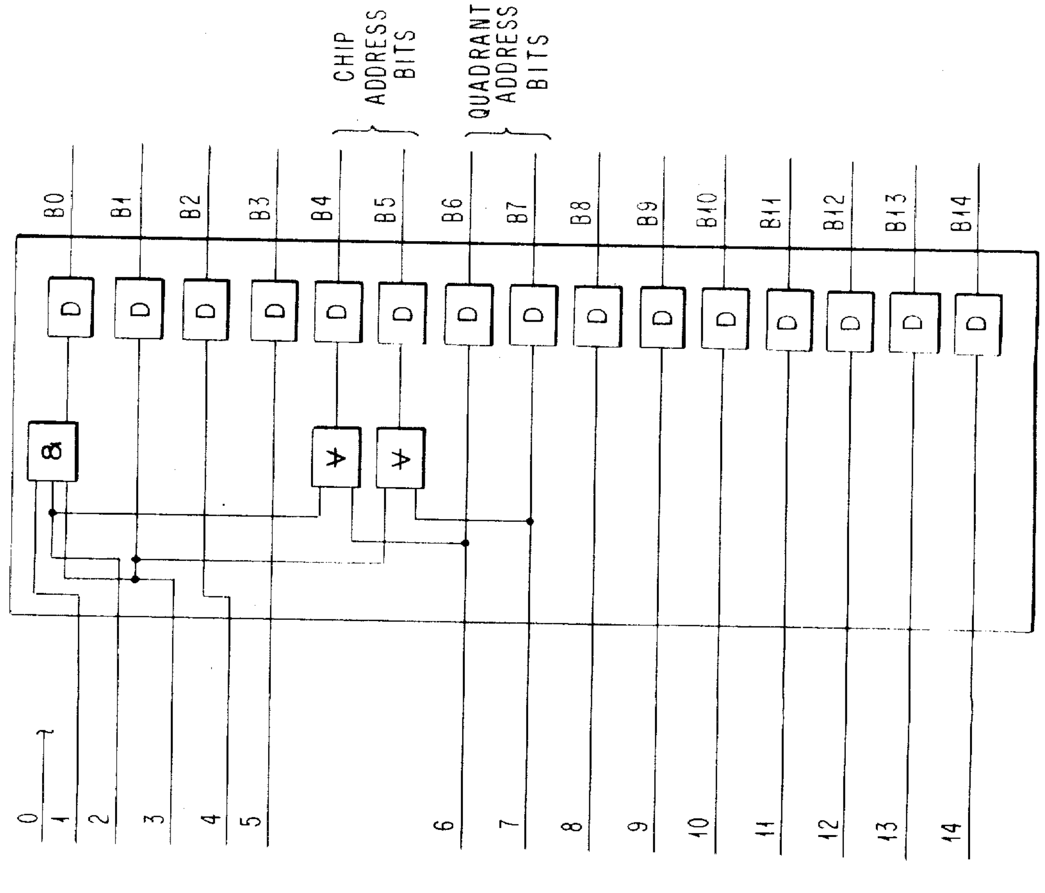

FIGS. 11A and 11B illustrate the use of 25 percent good, 75 percent good and 100 percent good modules.

Figure 12:
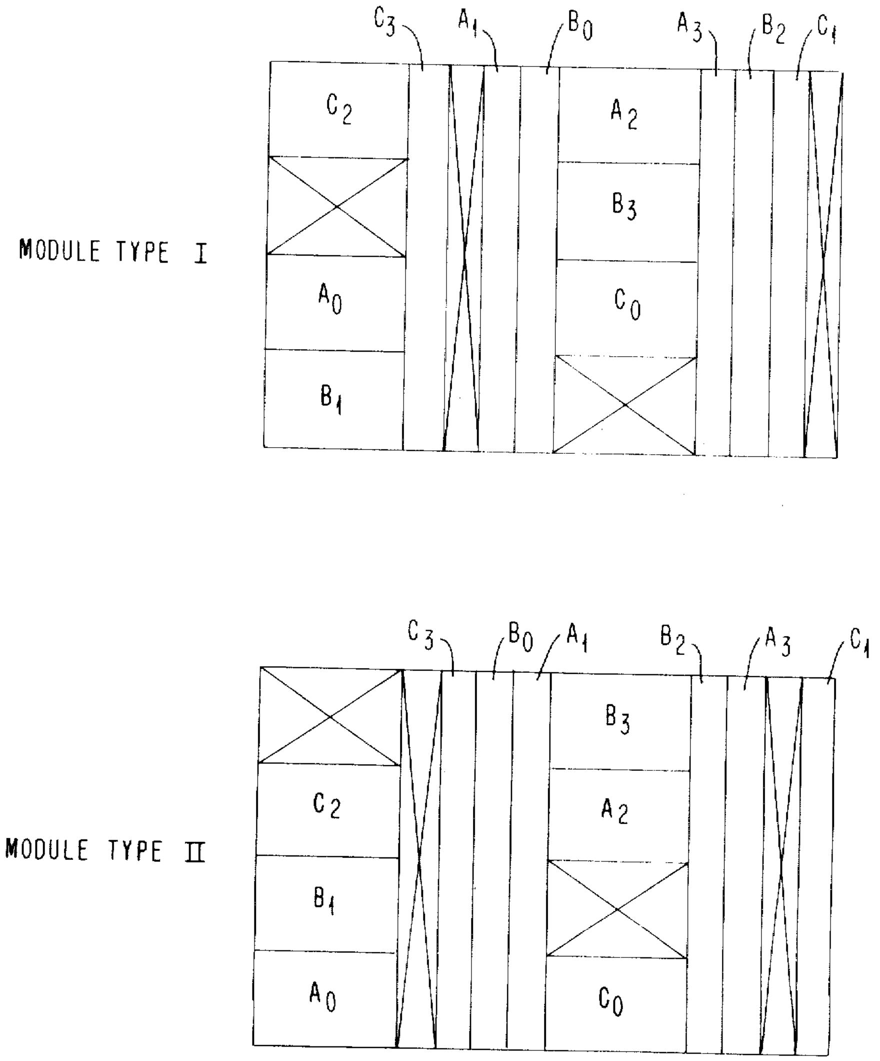
FIGS. 12A and 12B are a logic diagram and chart of a decoder for combining modules of different types.
Figure 13A:
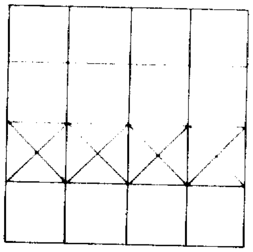
FIGS. 13A – 13F are illustrations of other various ways defective chips may be utilized in a memory.
Figure 13B:
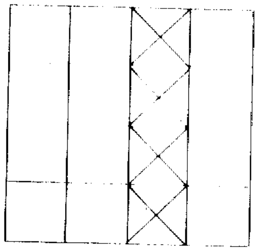
Figure 13C:
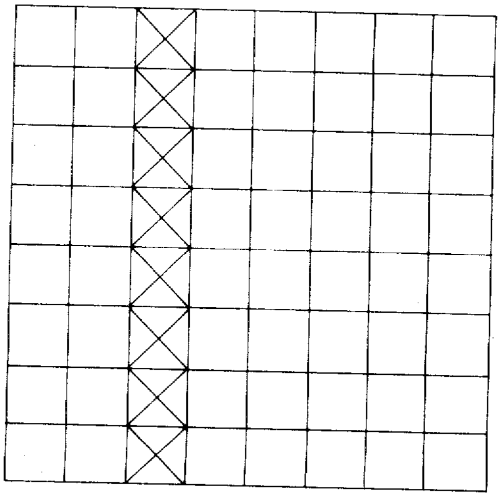
Figure 13D:
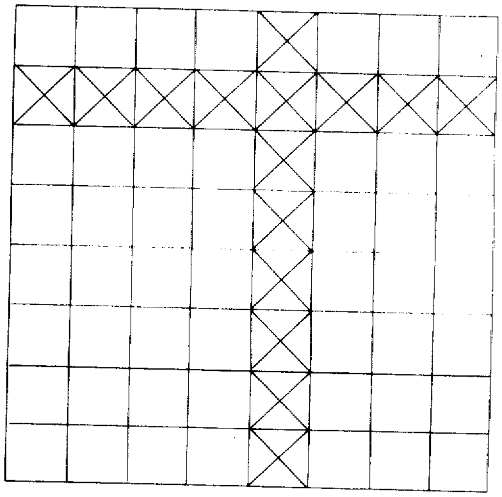
Figure 13E:
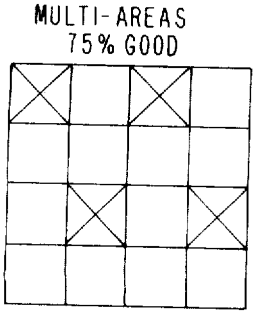
Figure 13F:
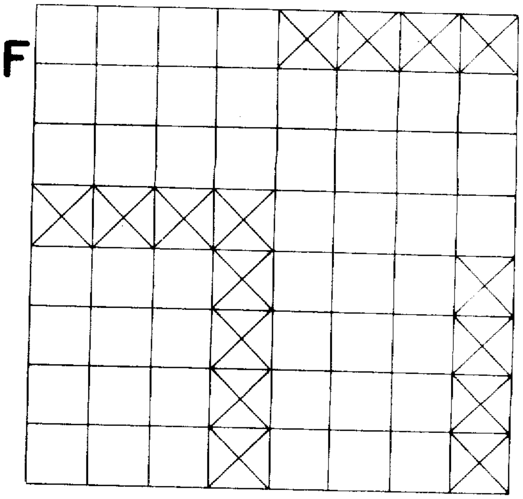

Referring to FIG. 12, two different module types can be accommodated on a single card. Each module is 75 percent utilized. The two module types provide a means for accommodating more defective chips than one module type. This provides more flexibility in handling an uneven distribution of defective chips should this occur.

Referring to FIG. 12, the type 1 and type 2 modules each contain four chips. The chips are divided into four quadrants.

The physical location that is accessed as result of an ordered sequence of addresses, is shown by the letter designation $A_0, A_1 \ldots A_n$; $B_0, B_1 \ldots B_n$; $C_0, C_1 \ldots C_n$. The shaded portion of each chip indicates the defective area which is not accessed in the lower three-fourths of the address spectrum by translation circuitry (not shown). With this logical arrangement, eight different chip combinations can be accommodated by the logic circuitry.

If a common word line, a common bit line, or a bit sense line is defective at the chip level, this chip can be utilized in one of the chip positions shown in FIG. 12. This can be more clearly understood by reference to FIG. 2. Suppose in FIG. 2 one of the outputs from the word decoder 30 is defective. This would cause all the cells in a horizontal row in the chip array to be essentially defective or unaccessible. The same is true if one of the outputs from bit decoder 32 is defective; all of the cells in a vertical column are unaccessible. Since the chips of FIG. 12 have defective quadrants set aside in the horizontal and vertical direction, if either the word decoder output or the bit decoder output is defective, that chip can be utilized in the module.

The embodiments disclosed in this specification are for purposes of illustration only and are not intended to limit the invention to particular configurations shown. Space does not permit exhausting all of the combinations of partially defective, non-defective or wholly defective chips (partially defective modules) or partially defective cards which can be combined by utilizing the teachings of this invention. For example, it may be advantageous to sort chips which have more than one quadrant defective or chips which have a bit line or a word line which is defective. FIGS. 13A–13G are illustrations of other various ways defective chips or modules which may be combined.

Figure 7:
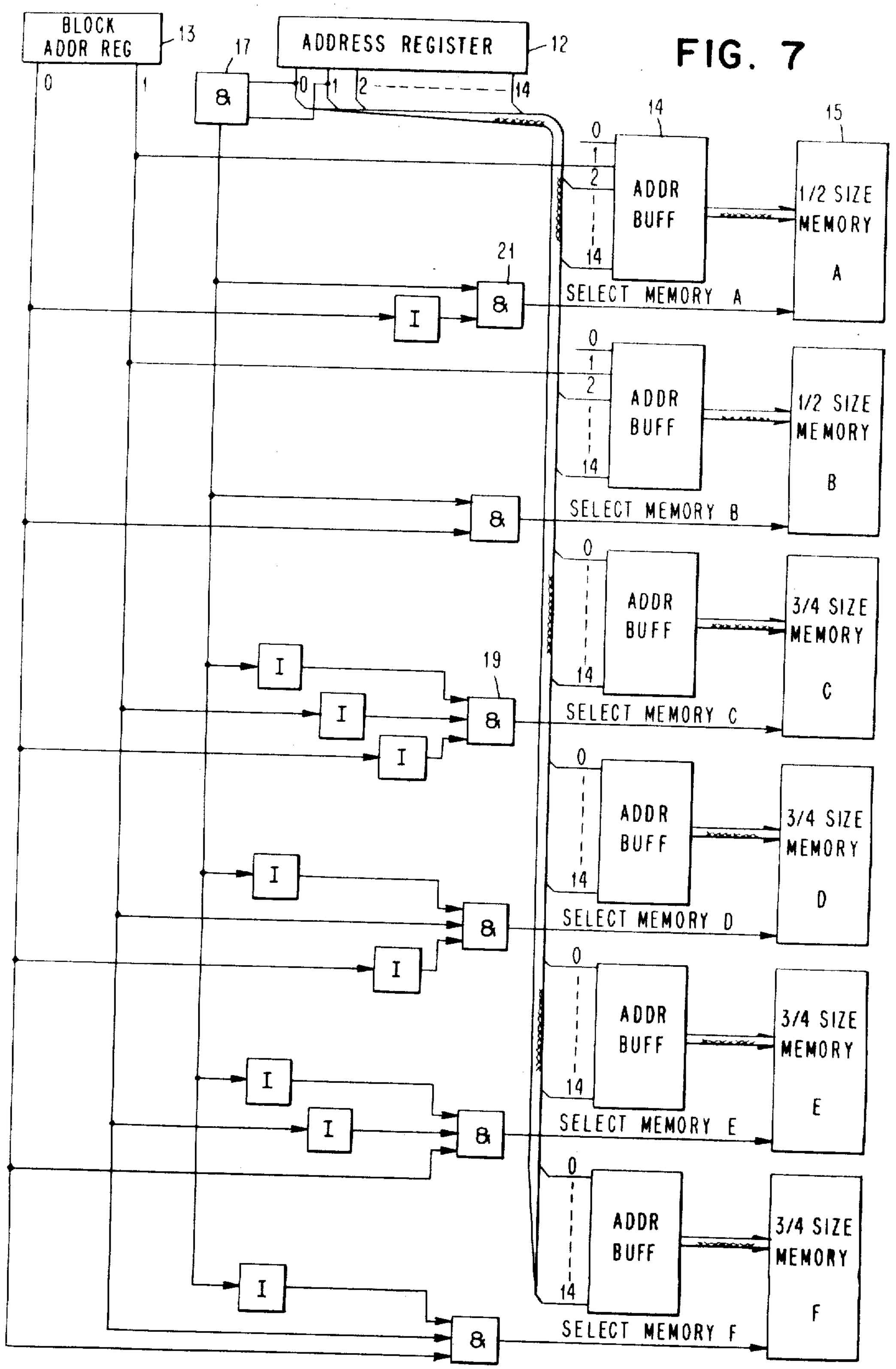
FIG. 7 is a block schematic diagram of a system combining partial memories.

Referring to FIG. 7, memories A, B, C, D, E and F are combined so that only a fraction of each memory is utilized in a manner such that the entire combination is addressed by contiguous memory addresses. The result is a combination of memories which appears to the user to be one logical memory.

Each memory 15 contains 32K addressable locations. Memories C, D, E and F are 75 percent utilized. Memories A and B are 50 percent utilized. Partial memories can, of course, also be combined with 100 percent memories. Each memory is provided with a decoder 14 which can decode up to 15 binary inputs which will provide outputs for selecting the memory locations. Addresses are presented to the memory system by means of address register 12 which stores a 15 bit binary address. High order address positions are provided by block address register 13.

For low numbered addresses, the high order bit positions 0 and 1 of address register 12 do not energize AND circuit 17. The output of AND circuit 17 is negative and is inverted to thereby energize one leg of AND circuit 19. For low order addresses, the block address register 13 contains zeros. The output 1 which is negative is inverted to energize the other leg of AND circuit 19 thereby energizing the output SELECT C. This causes memory C to be selected. Memory C remains selected for approximately 24K contiguous addresses until the address is reached which causes the high order bit positions 0 and 1 of address register 12 to be energized. This causes an output from AND circuit 17 to energize AND circuit 21, the output of which energizes SELECT MEMORY A to select the one-half size memory A. The input to the address buffer 14 of memory A has the high order position 1 connected to the block address register 13. This provides for energizing the address buffer with only the low order bit positions 2 – 14. Memory A is addressed during the first selection for only one-fourth of the memory addresses. The second selection of memory A selects the remaining one-fourth of useable positions. This is illustrated by the following table which shows the selection sequence.

| Block Address | Address Reg. | |
|---|---|---|
| 00 | 00XX—X | Select Memory C |
| 00 | 11XX—X | Select Memory A (first 1/4) |
| 01 | 00XX—X | Select Memory D |
| 01 | 11XX—X | Select Memory A (second 1/4) |
| 10 | 00XX—X | Select Memory E |
| 10 | 11XX—X | Select Memory B (first 1/4) |
| 11 | 00XX—X | Select Memory F |
| 11 | 11XX—X | Select Memory B (second 1/4) |

Thus, contiguous binary addresses supplied to address register 12 and block address register 13 select non-contiguous memory addresses in the memories A – F.

While the invention has been particularly shown and described with reference to preferred embodiments thereof, it will be understood by those skilled in the art that the foregoing and other changes in form and details may be made therein without departing from the spirit and scope of the invention.

What is claimed is:

1. For use in a memory system of the type in which a plurality of addressable locations are selected by decoding means which decode a contiguous set of unique first address manifestations, a translator for translating said first address manifestation into a set of unique second address manifestations which omit predetermined ones of said contiguous set comprising:

a number ($n$-$k$) of input leads each representing a bit position order of said first address manifestations;

a number ($m$) of output leads each representing a bit position of said second address manifestations and having a one-for-one correspondence with said first input leads;

means connecting each of $k$ input leads to the next higher order output lead; and means connecting at least one of said $k$ input leads to two or more of said output leads;

whereby said decoder translates $n$ of the address bits comprising said first address manifestations into $m$ address bits of said second address manifestations wherein one of said $n$ bits controls at least two of said $m$ bits.

2. The combination according to claim 1 wherein the input lead representing the highest order bit position of said first address manifestation is exclusive ORed with said means connecting said one of said $k$ input leads to said two of said output leads.

* * * * *